US008982572B2

(12) United States Patent
Hsu et al.

(10) Patent No.: US 8,982,572 B2
(45) Date of Patent: Mar. 17, 2015

(54) CONTROL DEVICE FOR EXECUTING OPEN MODE OF MOTION MODULE OF ELECTRIC APPARATUS

(75) Inventors: An Szu Hsu, New Taipei (TW); Chien Cheng Mai, New Taipei (TW); Kuo Cheng Liao, New Taipei (TW)

(73) Assignee: First Dome Corporation, New Taipei (TW)

( * ) Notice: Subject to any disclaimer, the term of this patent is extended or adjusted under 35 U.S.C. 154(b) by 434 days.

(21) Appl. No.: 13/549,578

(22) Filed: Jul. 16, 2012

(65) Prior Publication Data

US 2014/0016276 A1    Jan. 16, 2014

(51) Int. Cl.
| H05K 5/00 | (2006.01) |
| H05K 7/00 | (2006.01) |
| A47G 1/10 | (2006.01) |
| A47B 96/06 | (2006.01) |
| G11B 33/02 | (2006.01) |
| G06F 1/16 | (2006.01) |

(52) U.S. Cl.
CPC ............ *G06F 1/1616* (2013.01); *G06F 1/1618* (2013.01)
USPC . 361/755; 361/759; 361/679.04; 361/679.06; 361/679.26; 361/679.27; 361/679.3; 248/316.5; 248/292.14; 248/229.22; 369/75.21

(58) Field of Classification Search
USPC ............... 361/679.01–679.09, 679.1–679.19, 361/679.21–679.29, 679.31–679.45, 361/679.55–679.6, 724–747; 248/917–924, 248/80–88, 155.1–155.5, 166–173, 248/180.1–186.2, 229.1–231.51, 271.4, 248/292.14, 316.1; 292/1–62, 113, 292/169.11–169.23, 341.11–341.19; 369/75.1, 75.2, 75.11, 75.21, 76, 369/77.11, 77.21, 78, 79, 80, 81, 82
See application file for complete search history.

(56) References Cited

U.S. PATENT DOCUMENTS

| 2012/0238332 A1* | 9/2012 | Mai et al. .................... 455/575.4 |
| 2013/0022297 A1* | 1/2013 | Mai et al. ........................ 384/26 |
| 2013/0121626 A1* | 5/2013 | Hsu et al. ........................ 384/26 |

* cited by examiner

*Primary Examiner* — Jerry Wu
(74) *Attorney, Agent, or Firm* — Rosenberg, Klein & Lee (57) ABSTRACT

The invention relates to a control device for executing an open mode of a motion module of an electric apparatus. The electric apparatus includes a motion module and a machine body module. The control device disposed on a path of the relative movement includes a combination of a carrier and an elastomer, in which the carrier has a blocking portion. The elastomer normally keeps the carrier at a first position, and the elastomer allows the carrier to motion toward a second position when the carrier is pressed. The control device allows the motion module to rotate (in an open mode) when the motion module crosses the blocking portion of the carrier. Accordingly, the invention promotes visual artistic effects by eliminating the essential exposure of the rotary shaft in the rotation-open mode of conventional skills.

22 Claims, 6 Drawing Sheets

CONTROL DEVICE FOR EXECUTING OPEN MODE OF MOTION MODULE OF ELECTRIC APPARATUS

BACKGROUND OF THE INVENTION

1. Field of the Invention

The invention relates to a control device for executing an open mode of a motion module of an electric apparatus, in particular relates to a combination of a carrier and an elastomer which allows an operator to rotate the motion module (in an open mode) when the motion module crosses the carrier.

2. Description of the Related Art

Devices that utilize a slide cover system which is capable of being reciprocally moved or freely rotated by an external force to be assembled on an electric apparatus (e.g., mobile phones, laptops, personal digital assistants (PDAs), digital cameras and electronic-books, etc.), capable of enabling a slide cover portion to be motioned to perform opening and closing functions, are generally known as conventional skills.

These slide cover modules or components are generally cooperated with members such as a movable shelf, a linking-up plate, elastic members, a wire used for linked traction or a guide rail formed of particular shape, thus assisting the slide cover modules with the opening and closing movements. For increasing the movement of the slide cover modules, a structure capable of providing the with movement and rotation functions has disclosed in conventional skills.

In 'HANDHELD ELECTRONIC DEVICE' of U.S. Patent 2008/0174942 A1 (corresponding to Taiwan Patent Application No. 96102224) also specifically discloses a structure capable of providing the with movement and rotation functions. In '942 case, the handheld electronic includes a body having an input unit, a display portion, a connection mechanism pivoted to the body and the display portion and having at least rotary shaft fixed in the body, a first plate connected to the display portion, and a second plate slidably connected to the first plate and having at least one side fixed on the rotary shaft of the connection mechanism. When sliding the display portion located on the first plate until the rotary shaft is exposed, the display portion can be rotated relative to the body.

One topic related to operations, motions and structure designs of the above-described cases shall be concerned is that, based on satisfying the tendency of style design toward a light, handy and miniaturized electric apparatus as well as considerations on inner structures and spatial arrangement patterns thereof, the rotation-open mode of the display portion can be operably performed only when sliding the display portion until the rotary shaft is exposed. However, it can be appreciated that the visual artistic effects of the electric apparatus is impaired, and certainly these conditions are not our expectations.

Representatively speaking, the disclosures of the above-mentioned reference data reveal the conditions of usage and structural design of the slide cover module or other components connected therewith. If the structure and above-described applications of the slide cover module (or the motion module) or other components connected therewith can be properly redesigned and reconsidered, the use pattern and the application conditions of the slide cover module can be advancedly altered, thus to be distinguished from conventional products and methods. In fact, a simplified structure of the electric apparatus can be obtained in the design process, and visual artistic effects can be promoted by eliminating the essential exposure of the rotary shaft in the rotation-open mode of conventional skills. However, the above-described topics do not physically taught or implied in the cited reference data.

BRIEF SUMMARY OF THE INVENTION

In view of this, the purpose of the invention is to provide a control device for executing an open mode of a motion module of an electric apparatus, thereby promoting visual artistic effects by eliminating the essential exposure of the rotary shaft in the rotation-open mode of conventional skills. The electric apparatus includes a motion module and a machine body module. The control device disposed on a path of the relative movement includes a combination of a carrier and an elastomer, in which the carrier has a blocking portion. The elastomer normally keeps the carrier at a first position, and the elastomer allows the carrier to motion toward a second position when the carrier is pressed. The control device allows the motion module to rotate (in an open mode) when the motion module crosses the blocking portion of the carrier.

According to a control device for executing an open mode of a motion module of an electric apparatus of the invention, the carrier and the elastomer are disposed in a slot compartment formed on the electric apparatus. The motion module is disposed with a limiting portion. When the motion module is reciprocally moved to drive the limiting portion to arrive at the position of the carrier, the limiting portion is blocked by the blocking portion of the carrier. Further, in cooperation with the rotation or upward movement of the motion module, the limiting portion crosses the blocking portion of the carrier, so that a rotation-open mode of the motion module can be completed.

According to a control device for executing an open mode of a motion module of an electric apparatus of the invention, a rotary shaft and a base frame pivoted to the rotary shaft are disposed between the motion module and the machine body module. The base frame is combined with the motion module, so that the motion module can freely move along the base frame. Moreover, when the limiting portion of the motion module arrives at the position of the blocking portion of the carrier, the limiting portion can cross the blocking portion of the position of the carrier in cooperation with the motion module to be motioned by taking the rotary shaft as a spindle pivot for rotation or upward movement, so that a rotation-open mode of the motion module can be completed.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
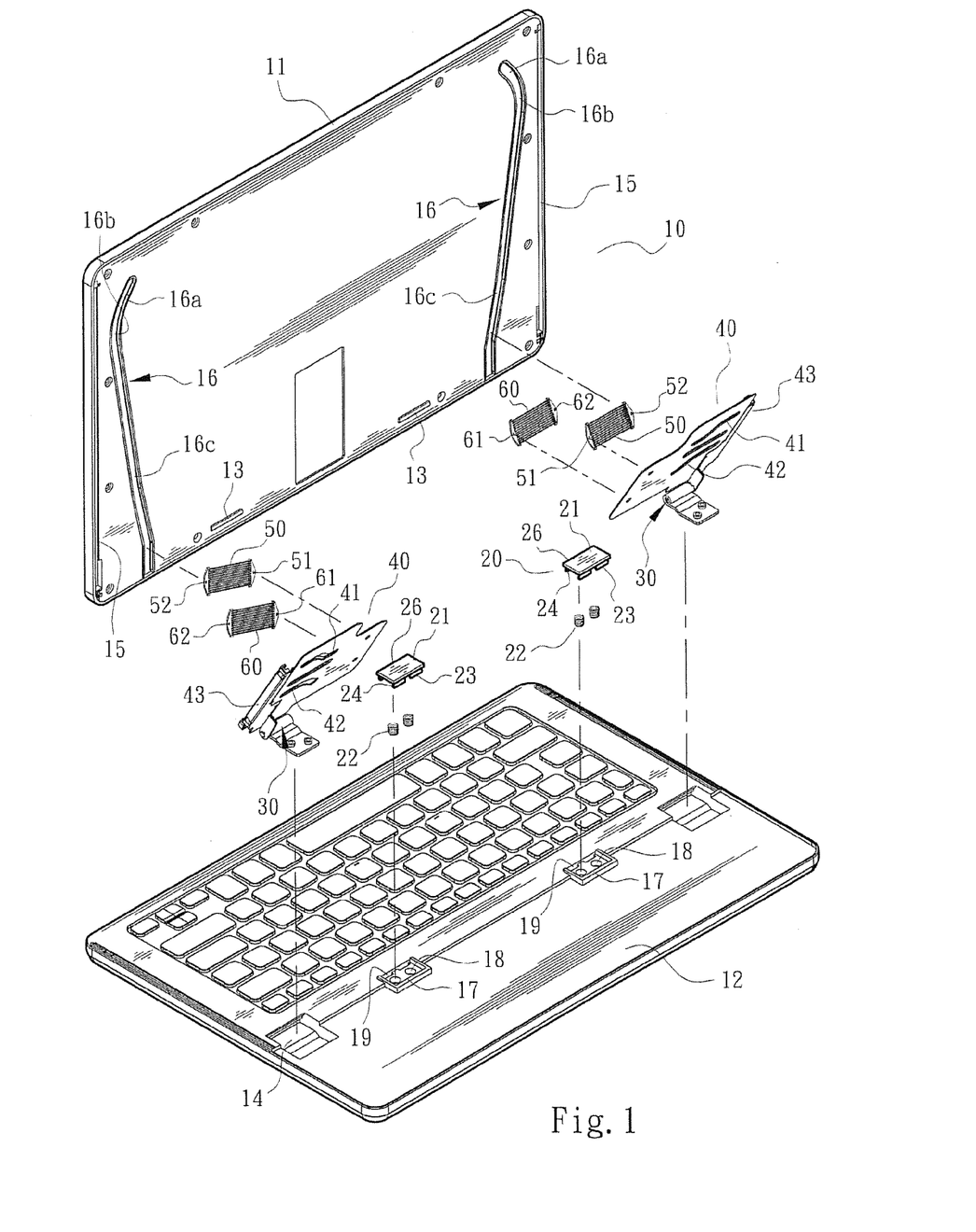
FIG. 1 is an exploded schematic view of the structure of the invention.

Referring to FIG. 1, the invention provides a control device for executing an open mode of a motion module of an electric apparatus. The invention includes a combination of an electric apparatus and a control device, which are generally denoted by reference numbers 10 and 20, respectively. The electric apparatus 10 comprises a motion module 11 and a machine body module 12, in which the machine body module 12 comprises a message input region (e.g., a keyboard). In an executable embodiment, for acquiring functions of relative movement and rotation between the motion module 11 and the machine body module 12, a rotary shaft 30 and a base frame 40 pivoted to the rotary shaft 30 are disposed between the motion module 11 and the machine body module 12. In an adopted embodiment, the machine body module 12 is disposed with a concave compartment 14 which is assembled with the rotary shaft 30, and the motion module 11 comprises a limiting portion 13 which is formed by a type of convex rib and located at a position to be near to a user end.

In FIG. 1, the base frame 40 formed by a type of plate-like article is illustrated. The coupling portion 43 of the base frame 40 formed by a type of similar U-shaped section is assembled on a slot way 15 which is disposed at a side position of the motion module 11. With the slot way 15 of the motion module 11 correspondingly assembled with the coupling portion 43 of the base frame 40, the motion module 11 therefore can relatively move along the base frame 40; moreover, when the motion module 11 is reciprocally moved to a setting position (it will be described in detail hereinafter), the motion module 11 is allowed to motion by taking the rotary shaft 30 as a spindle pivot for rotation or upward movement.

Figure 2:
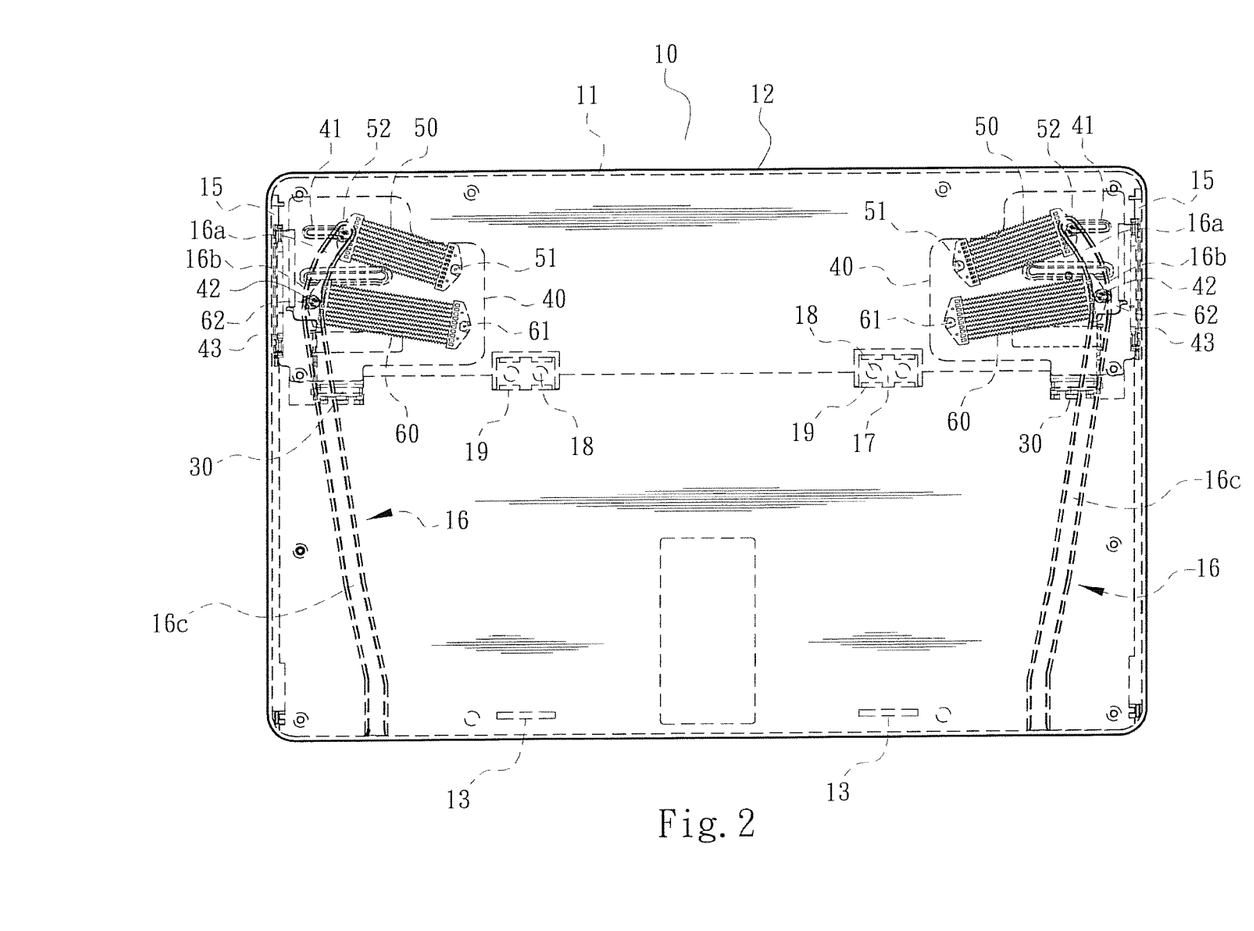
FIG. 2 is an assembled schematic view of the structure of the invention, illustrating that a motion module is covered on a machine body module, positions of a slot compartment and a limiting portion are displayed by imaginary lines, and an arrangement of a rail, a first guide slot and a second guide slot of a base frame, a first elastic device and a second elastic device are displayed.

FIGS. 1 and 2 also illustrate that a first elastic device 50 and a second elastic device 60 are disposed between the motion module 11 and the base frame 40. Concretely speaking, the motion module 11 is disposed with a rail 16 which includes a first segment 16a, a curved portion 16b connected to the first segment 16a, and a second segment 16c connected to the curved portion 16b. The base frame 40 is disposed with a first guide slot 41 and a second guide slot 42. The first elastic device 50 comprises a fixation end 51 and a motion end 52, and the second elastic device 60 comprises a fixation end 61 and a motion end 62, in which the fixation end 51 of the first elastic device 50 and the fixation end 61 of the second elastic device 60 are fixed on the base frame 40, the motion end 52 of the first elastic device 50 is pivoted to the rail 16 of the motion module 11 and the first guide slot 41 of the base frame 40, and the motion end 62 of the second elastic device 60 is pivoted to the rail 16 of the motion module 11 and the second guide slot 42 of the base frame 40.

Referring to FIG. 1, the control device 20 disposed on a path of the relative movement comprises a combination of a carrier 21 and an elastomer 22, in which the carrier 21 having a blocking portion 26 is movable between a first position and a second position. The electric apparatus 10 is formed with a slot compartment 17, and the carrier 21 and the elastomer 22 are disposed in the slot compartment 17 of the electric apparatus 10. The elastomer 22 formed by type of a helical spring normally keeps the carrier 21 at the first position, and the elastomer 22 allows the carrier 21 to motion toward the second position when the carrier 21 is pressed.

Figure 3:
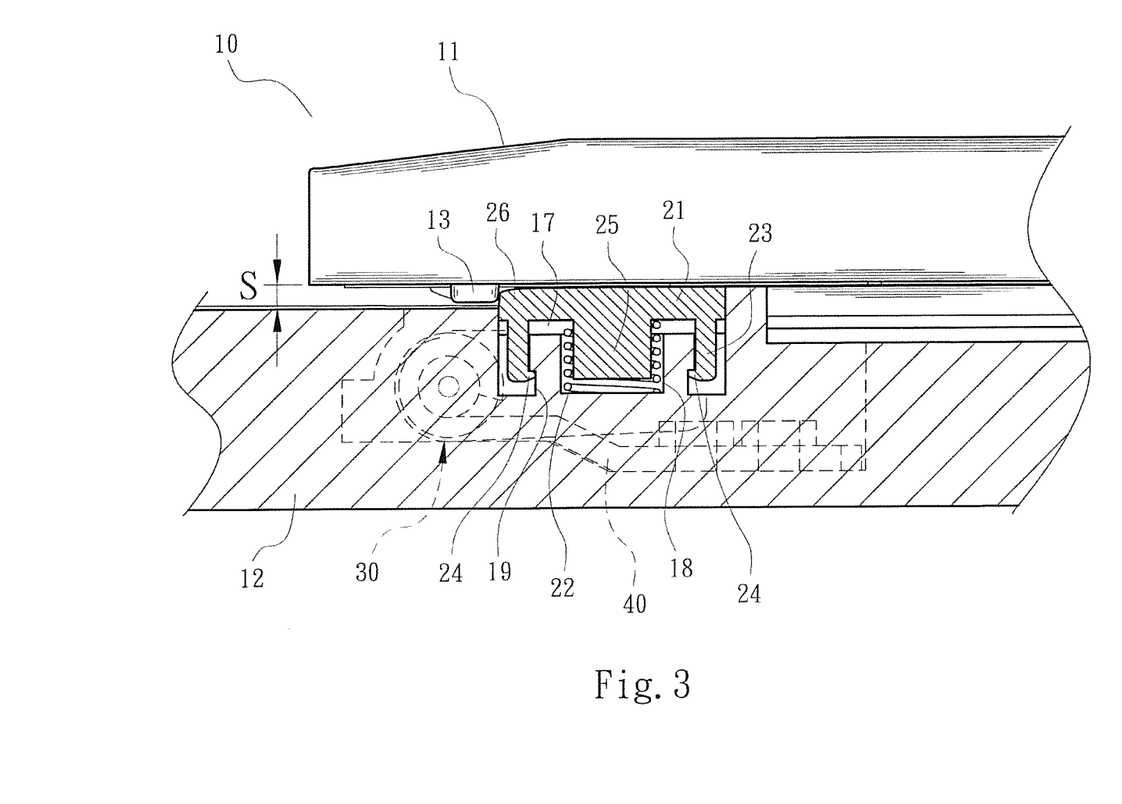
FIG. 3 is a sectional schematic view of the partial structure of the invention, illustrating a stroke of reciprocal movement of a motion module and a condition of a limiting portion blocked by a blocking portion of a carrier.

Specifically speaking, the slot compartment 17 is formed on the machine body module 12 of the electric apparatus 10, in which the slot compartment 17 is formed with at least one cavity 18 and at least one concave portion 19. The carrier 21 is disposed with at least one arm 23 and a finger portion 24 formed on the arm 23. The carrier 21 is disposed with at least one pile 25 (see FIG. 3) which is utilized to assemble with the elastomer 22. In FIG. 3, it is particularly illustrated that the pile 25 of the carrier 21 and the elastomer 22 are installed in the cavity 18 of the slot compartment 17, and the finger portion 24 of the arm 23 is assembled with the concave portion 19 of the slot compartment 17. As illustrated in FIG. 3, the position of the carrier 21 engaged to the elastomer 22 is defined as the first position in principle.

Referring to FIG. 2, a condition of the motion module 11 being covered on a machine body module 12 is illustrated, in which the position of the motion module 11 is defined as an initial position. At this moment, the motion end 52 of the first elastic device 50 is moved to a position where is located at an end point of the first segment 16a of the rail 16 and at a middle region of the first guide slot 41 of the base frame 40; meanwhile, the motion end 62 of the second elastic device 60 is moved to a position where is located at the curved portion 16b of the rail 16 and near to an end point of the second guide slot 42 of the base frame 40, thus forming a tensioned energy-storage state.

Figure 4:
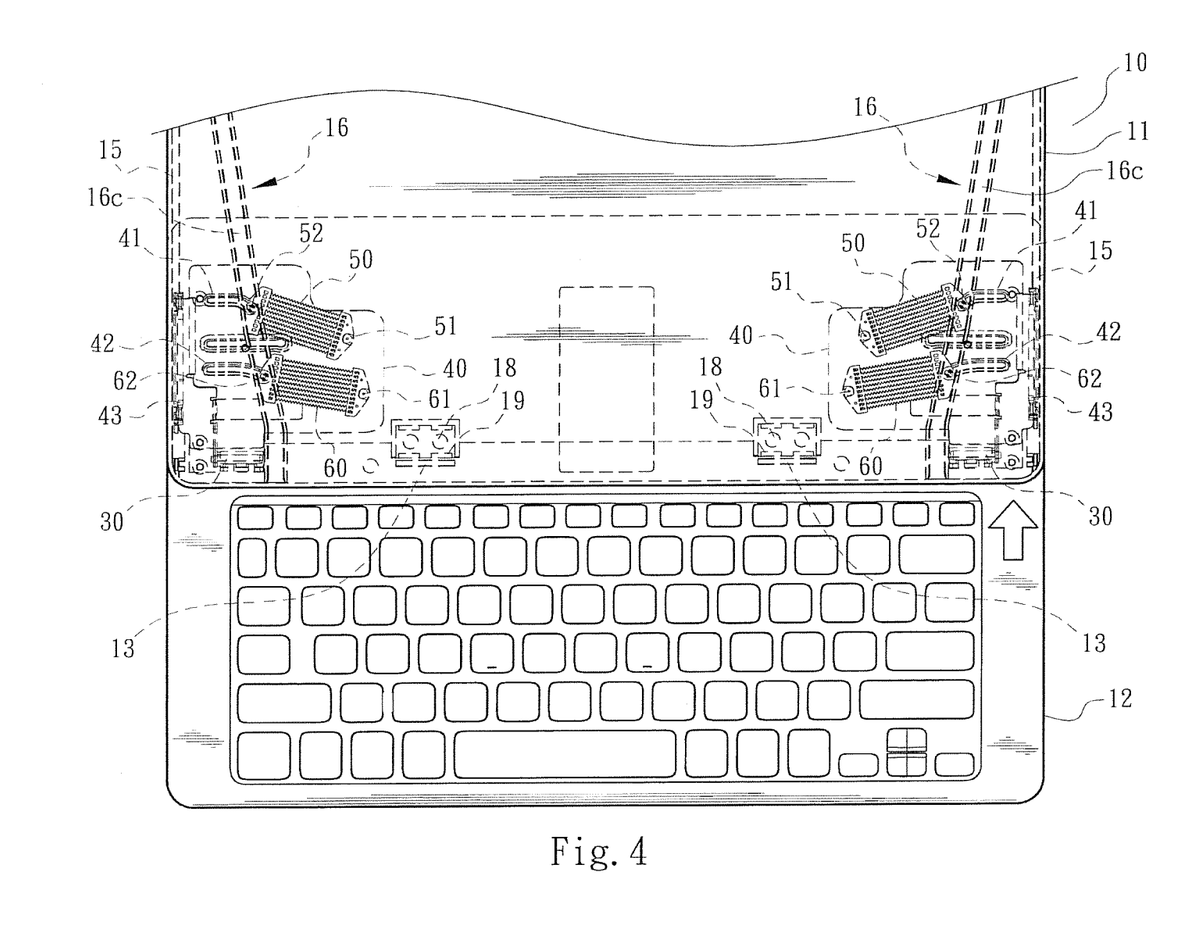
FIG. 4 is a schematic view of an operative embodiment, illustrating a stroke of reciprocal movement of a motion module, a condition of a limiting portion when arriving at the position of a blocking portion of a carrier, and a relative position of a first elastic device, a second elastic device, and a first guide slot and a second guide slot of a base frame.

Referring to FIGS. 2 and 4, when the motion module 11 is forced to move reciprocally, due to the motion end 52 of the first elastic device 50 and the motion end 62 of the second elastic device 60 which are towed by the rail 16, the motion end 52 of the first elastic device 50 is relatively moved from the first segment 16a to the second segment 16c (where the first elastic device 50 is in an energy-release state) via the curved portion 16b (where the first elastic device 50 is in a tensioned energy-storage state) of the rail 16, in which, at this moment, due to the motion end 52 of the first elastic device 50 to be located at the second segment 16c of the rail 16 and the first elastic device 50 to be in the energy-release state, the motion end 52 of the first elastic device 50 is located at a position to be near to an end point of the first guide slot 41 of the base frame 40 (as illustrated in FIG. 4); meanwhile, the motion end 62 of the second elastic device 60 is relatively moved from the curved portion 16b (where the second elastic device 60 is in a tensioned energy-storage state) to the second segment 16c (where the second elastic device 60 is in an energy-release state) of the rail 16, in which, at this moment, due to the motion end 62 of the second elastic device 60 to be located at the second segment 16c of the rail 16 and the second elastic device 60 to be in the energy-release state, the motion end 62 of the second elastic device 60 is located at a position to be near to an end point of the second guide slot 42 of the base frame 40 (as illustrated in FIG. 4).

Basically, with the rail 16 of the motion module 11 to be engaged with the first and second elastic devices 50 and 60 and the first and second guide slots 41 and 42 of the base frame 40, a user can labor-savingly operate the motion module 11 of the electric apparatus 10. It is to be understood that other sliding devices can be utilized to attain the function of relative movement of between the motion module 11 and the machine body module 12.

Referring to FIGS. 3 and 4, a condition that the limiting portion 13 is arrived at the position of the carrier 21 when the motion module 11 is forced to move reciprocally, is illustrated. When the limiting portion 13 is arrived at the position of the carrier 21, the limiting portion 13 is blocked by the blocking portion 26 of the carrier 21 (or the limiting portion 13 and the blocking portion 26 of the carrier 21 form interference therebetween). In a preferred embodiment, a clearance S is provided between the motion module 11 and the machine body module 12. With the clearance S provided between the motion module 11 and the machine body module 12, the user is capable of operating the motion module 11 by taking the rotary shaft 30 as a spindle pivot for rotation or upward movement, thus enabling the limiting portion 13 to cross the blocking portion 26 of the position of the carrier 21, as the condition shown in FIG. 5.

Figure 5:
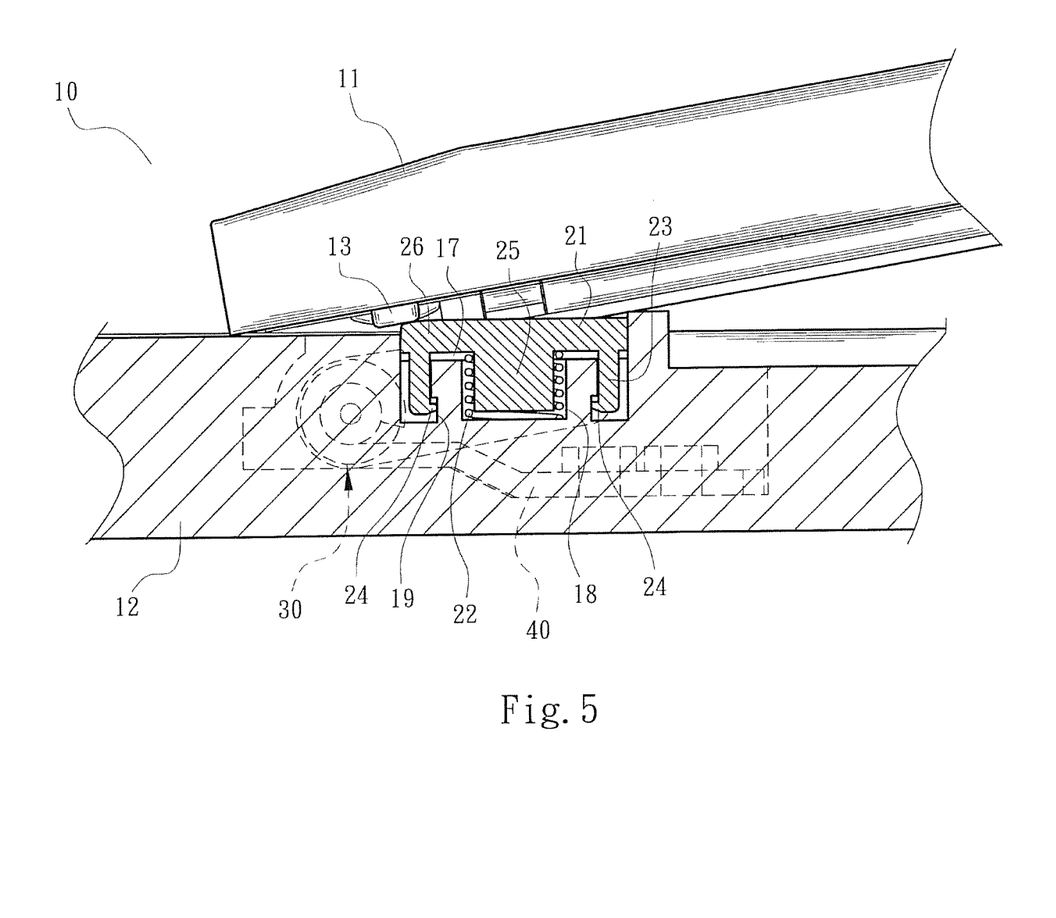
FIG. 5 is a schematic view of an operative embodiment, illustrating a condition of operating a motion module to rotate or elevate so as to enable a limiting portion to cross a blocking portion of a carrier.
Figure 6:
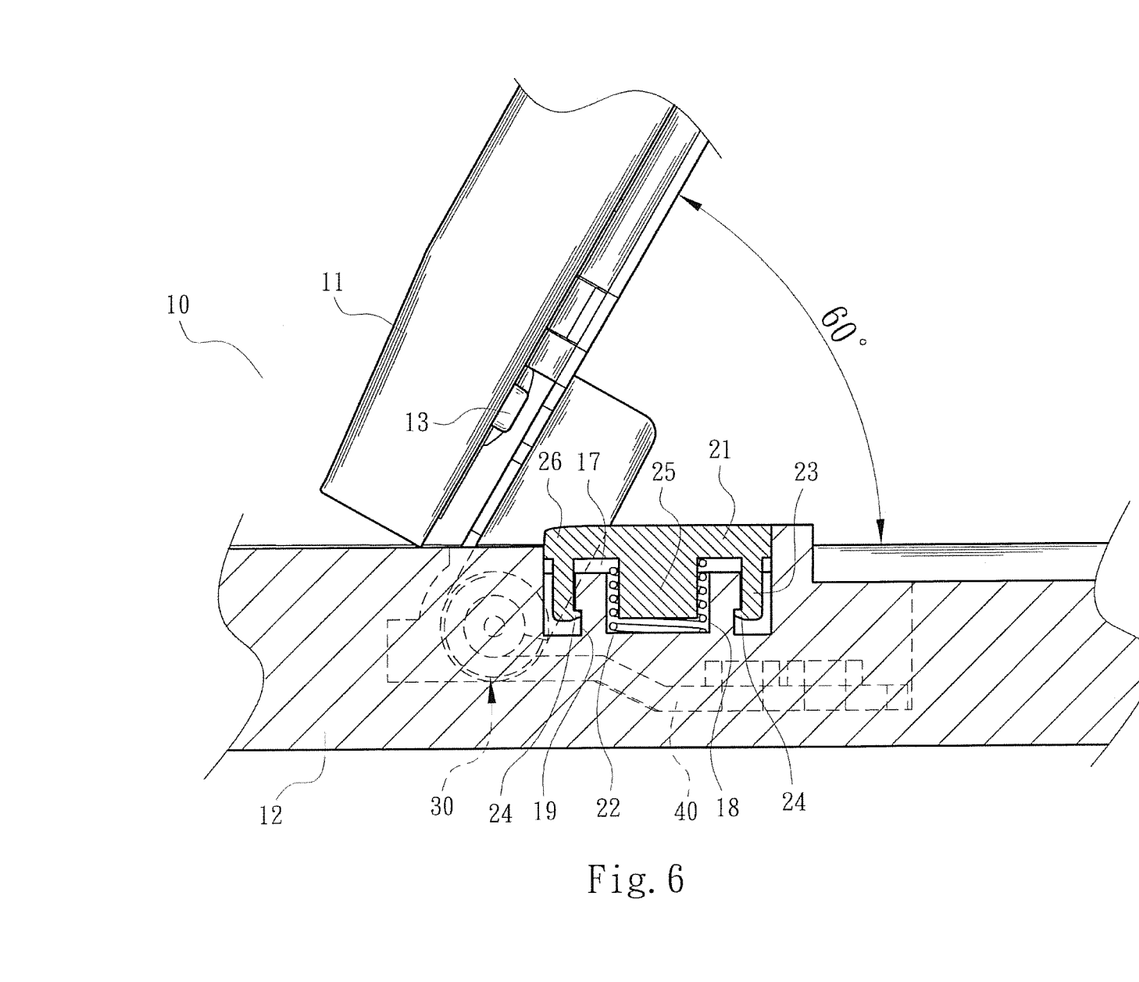
FIG. 6 is a schematic view of another operative embodiment, illustrating a condition of operating a motion module to reciprocally move and rotate so as to enable a limiting portion to leave a carrier, and a condition of releasing energy from an elastomer to drive the carrier back to a first position.

A condition that the carrier 21 downwardly pressed by the limiting portion 13 is motioned toward the second position so as to drive the elastomer 22 to store energy therein, is also illustrated in FIG. 5. Therefore, a rotation-open mode of the motion module 11 can be completed in accordance with the reciprocal movement and rotation of the motion module 11 (e.g., the condition illustrated in FIG. 6). A condition that the elastomer 22 releases the stored energy to drive the carrier 21 back to the first position when the carrier 21 leaves the carrier 21, is also illustrated in FIG. 6.

Representatively speaking, with the motion module 11 to be assisted for operational movement, the control device 20 for executing the open mode of the motion module 11 of the electric apparatus 10 of the invention is provided with the following considerations and advantages, compared to conventional skills.

Firstly, the structure design and configuration relation of the motion module 11, the machine body module 12 or components connected therewith have been redesigned and reconsidered, capable of providing innovated use patterns and applications to be distinguished from conventional skills. Actually, the invention also provides various functions of simplified structures, such as the combination of the carrier 21 and the elastomer 22, the carrier 21 capable of being movable between the first position and the second position within the slot compartment 17, and the combination structure of the limiting portion 13 and the blocking portion 26, etc.

Secondly, in the stroke of reciprocal movement of the motion module 11, cooperated with the engagement of the limiting portion 13 and the blocking portion 26 of the position of the carrier 21, the motion module 11 must be operably rotated or elevated before the motion module 11 reaches the position of the rotary shaft 30, further cooperated with the movement and rotation operation of the motion module 11, thereby promoting visual artistic effects by eliminating the essential exposure of the rotary shaft in the rotation-open mode of conventional skills.

Accordingly, the invention effectively provides the control device for executing the open mode of the motion module of the electric apparatus, featuring of a unique spatial pattern different from conventional skills and incomparable advantages and inventiveness.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A control device for executing an open mode of a motion module of an electric apparatus, the electric apparatus comprising: a motion module and a machine body module, in which a relative sliding movement is executable between the motion module and the machine body module; a limiting portion disposed on the electric apparatus; and the control device disposed on a path of the relative movement and comprising a combination of a carrier and an elastomer, in which the carrier is movable between a first position and a second position, and the control device allows the open mode to be executed between the motion module and the machine body module when the limiting portion arrives at the first position of the carrier; and the carrier is disposed with at least one pile assembled with the elastomer, the carrier is further disposed with at least one arm and a finger portion formed on the arm; the electric apparatus comprises a slot compartment, at least one cavity formed on the slot compartment and at least one concave portion formed on the slot compartment; the pile of the carrier and elastomer are installed in the cavity of the slot compartment of the electric apparatus; and the finger portion of the arm is assembled on and limited by the concave portion of the slot compartment; wherein the limiting portion presses the carrier and drive the elastomer, the open mode can be completed in accordance with a rotation of the motion module caused by an elastic force released from the elastomer.

2. The control device for executing the open mode of the motion module of the electric apparatus as claimed in claim 1, wherein the carrier comprises a blocking portion.

3. The control device for executing the open mode of the motion module of the electric apparatus as claimed in claim 1, wherein the electric apparatus is formed with a slot compartment, and the carrier and the elastomer are disposed in the slot compartment.

4. The control device for executing the open mode of the motion module of the electric apparatus as claimed in claim 1, wherein the elastomer is formed by type of a helical spring, and the elastomer allows the carrier to motion toward the second position when the carrier is pressed.

5. The control device for executing the open mode of the motion module of the electric apparatus as claimed in claim 3, wherein the slot compartment of the electric apparatus is formed with at least one cavity and at least one concave portion.

6. The control device for executing the open mode of the motion module of the electric apparatus as claimed in claim 1, wherein the carrier is disposed with at least one arm and a finger portion formed on the arm.

7. The control device for executing the open mode of the motion module of the electric apparatus as claimed in claim 1, wherein the carrier is disposed with at least one pile assembled with the elastomer.

8. The control device for executing the open mode of the motion module of the electric apparatus as claimed in claim 1, wherein a rotary shaft and a base frame pivoted to the rotary shaft are disposed between the motion module and the machine body module.

9. The control device for executing the open mode of the motion module of the electric apparatus as claimed in claim 8, wherein the machine body module is disposed with a concave compartment assembled with the rotary shaft.

10. The control device for executing the open mode of the motion module of the electric apparatus as claimed in claim 1, wherein the limiting portion disposed on the motion module is formed at a position to be near to a user end.

11. The control device for executing the open mode of the motion module of the electric apparatus as claimed in claim 1, wherein the limiting portion is formed by a type of convex rib.

12. The control device for executing the open mode of the motion module of the electric apparatus as claimed in claim 8, wherein the base frame comprises a coupling portion.

13. The control device for executing the open mode of the motion module of the electric apparatus as claimed in claim 12, wherein the coupling portion of the base frame formed by a type of U-shaped section is assembled on a slot way.

14. The control device for executing the open mode of the motion module of the electric apparatus as claimed in claim 13, wherein the slot way is disposed at a side position of the motion module.

15. The control device for executing the open mode of the motion module of the electric apparatus as claimed in claim 8, wherein a first elastic device and a second elastic device are disposed between the motion module and the base frame.

16. The control device for executing the open mode of the motion module of the electric apparatus as claimed in claim 15, wherein the motion module is disposed with a rail including a first segment, a curved portion connected to the first segment, and a second segment connected to the curved portion;

the base frame is disposed with a first guide slot and a second guide slot; and each of the first elastic device and the second elastic device comprises a fixation end and a motion end, in which the fixation ends of the first elastic device and the second elastic device are fixed on the base frame, the motion end of the first elastic device is pivoted to the rail of the motion module and the first guide slot of the base frame, and the motion end of the second elastic device is pivoted to the rail of the motion module and the second guide slot of the base frame.

17. The control device for executing the open mode of the motion module of the electric apparatus as claimed in claim 15, wherein a clearance is provided between the motion module and the machine body module.

18. The control device for executing the open mode of the motion module of the electric apparatus as claimed in claim 3, wherein the slot compartment is formed on the machine body module.

19. The control device for executing the open mode of the motion module of the electric apparatus as claimed in claim 1, wherein the slot compartment is formed on the machine body module.

20. The control device for executing the open mode of the motion module of the electric apparatus as claimed in claim 8, wherein the base frame is formed by a type of plate-like article.

21. The control device for executing the open mode of the motion module of the electric apparatus as claimed in claim 1, wherein the machine body module comprises a message input region.

22. The control device for executing the open mode of the motion module of the electric apparatus as claimed in claim 2, wherein the limiting portion and the blocking portion of the carrier form interference therebetween when the limiting portion arrives at the position of the carrier.

* * * * *